April 18, 1961  D. C. MEYERS  2,979,946
VARIABLE AVERAGING METER
Filed March 17, 1958  2 Sheets-Sheet 2

INVENTOR:
D. C. MEYERS
BY: J. H. McCarthy
HIS AGENT

United States Patent Office 2,979,946
Patented Apr. 18, 1961

2,979,946

VARIABLE AVERAGING METER

Douglas C. Meyers, Metairie, La., assignor to Shell Oil Company, a corporation of Delaware Filed Mar. 17, 1958, Ser. No. 721,751

5 Claims. (Cl. 73—194)

This invention relates to equipment used in fluid flow systems and pertains more particularly to an apparatus for indicating the average value of a variable characteristic, e.g., gravity, of a fluid stream passing through a pipe line system.

At many tank farms employed in the oil industry a single tank may contain crude oils of two or more different gravities. In making deliveries from a tank containing crude oils of two or more different gravities, it is necessary to obtain in some way the average gravity of all the oil in the tank. This could be done by first intermixing the different crude oils within the tank but this is often not possible since the average storage tank is not equipped with mixing apparatus. At present it is necessary to first obtain a composite sample of the oil being run from the tank and then have a gravity test run on the composite sample. This system has the drawback of involving the manual handling of the sample together with providing a new and clean sample container before each delivery is made from the tank.

It is therefore a primary object of the present invention to provide an apparatus adapted to measure continuously the gravity of the oil as it is being run through a pipe line and to record the average gravity of the entire amount of oil delivered so that an average value of the gravity can be instantaneously determined at the time delivery has been completed.

Another object of the present invention is to provide an apparatus adapted to measure and indicate the average value of the variable characteristic of a fluid stream during the period it is being discharged from a container such as a tank or a dump-type meter.

These and other objects of this invention will be understood from the following description taken with reference to the drawing wherein.

Figure 1:
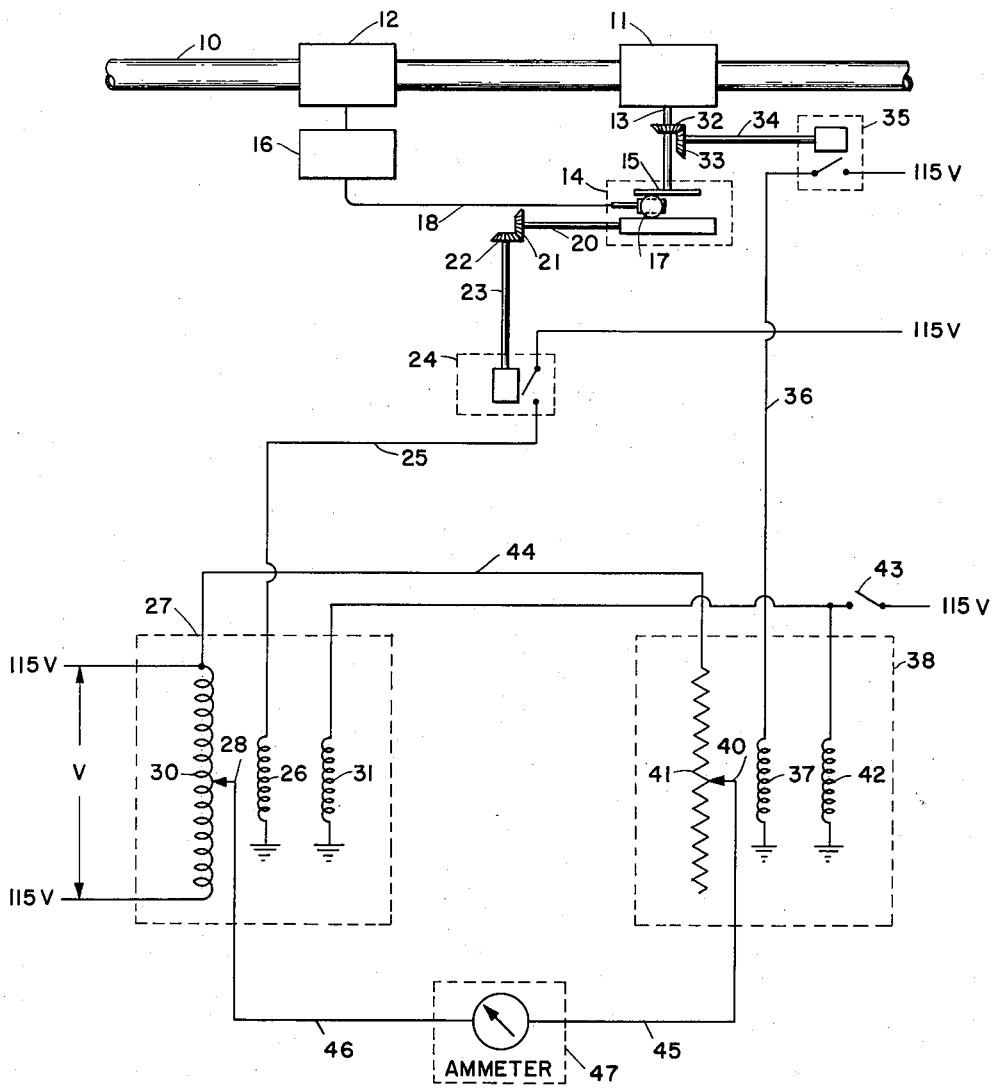
Figure 1 is a diagrammatic view illustrating the component parts of the present system.

Referring to the Figure 1 of the drawing, a pipe line is shown with a flowmeter 11 and a gravity measuring device 12 mounted in communication with the fluid in the pipe line 10. The flowmeter 11 may be of the positive-displacement type having a rotating shaft 13 which also forms the input shaft of a ball-and-disc linear integrator 14 to rotate the disc 15 therein.

The output signal from the gravity-measuring device 12 is fed to a converter 16 whose output signal alters the position of the ball mechanism 17 of the integrator 14, the converter 16 being operatively connected to said ball 17 through suitable signal transmission means 18 which may comprise either a mechanical linkage or a pneumatic or hydraulic tube.

The output shaft 20 of the ball-and-disc integrator 14 is operatively connected through gears 21 and 22 and shaft 23, or any other suitable linkage means, to a rotary switch 24 which is adapted to open and close at each revolution of shaft 23. Each time that the switch 24 is closed, current passes through lead 25 to an energizing coil 26 of an electrically-reset stepping variable transformer 27. Instead of variable transformer 27 a variable potentiometer or any other suitable tapped voltage source, for example a series of batteries, may be employed. Each time that the coil 26 is energized, the movable tap 28 of the transformer 27 moves stepwise a small increment along coil 30 to produce a voltage that is proportional to the fluid flow through the pipe line 10 times the gravity of the fluid. A reset coil 31 is provided in the stepping transformer 27 to return the movable tap 28 either manually or automatically to its zero position.

The flowmeter shaft 13 is likewise connected through gears 32 and 33 to the shaft 34 of a second rotary switch 35. The rotary switch 35 is positioned in the current lead 36 to the energizing coil 37 of an electrically-reset variable stepping resistor 38 whose movable tap 40 is moved stepwise a small increment along the tapped resistance wire 41.

The variable resistor 38 is provided with a reset coil 42 which is connected in parallel to the reset coil 31 of transformer 27 whereby, upon closure of a switch 43 both reset coils 31 and 42 are energized to return the movable taps 28 and 40 to their zero positions. A load circuit is formed by the connection of the transformer 27 in series with the resistor 38 and an ammeter 47 through leads 44, 45, and 46. The ammeter is calibrated preferably to read directly in values of the gravity of the material being measured.

In operation the output from the positive-displacement meter 11, either by direct or by Selsyn drive, actuates the rotary-type electrical switch 35 which causes the stepping variable resistor 38 to increase the load resistance in direct proportion to the gross accumulated volume of fluid metered by the flowmeter 11. The output from the flowmeter 11 also acts as the input to the ball-and-disc linear integrator 14. The ball mechanism 17 is positioned, through direct hydraulic or pneumatic transmission means, by the continuous gravity-measuring instrument 12 so that at minimum gravity the output of the integrator is equal to the input thereof, or to any convenient reference value. At maximum gravity, the output of the integrator is preferably twice its input speed or the selected reference value.

The output shaft 20, which is operatively connected to the rotary switch 24, causes the stepping potentiometer or transformer to increase the secondary voltage in direct proportion to the flowmeter and gravity input signals. The ammeter 47 in the load circuit, by correct calibration, indicates the average gravity of all the oil metered since the last reset of the variable transformer 27 and resistor 38. Reset of the transformer 27 and resistor 38 may be done either automatically or manually.

An example of the operation of the present apparatus to obtain a desired average gravity is as follows. For this example it is assumed that the gravity change in the oil being metered varies from 30° to 40° API. It is also assumed that the resistor 38 increases the load resistance 0.1 ohm per barrel of oil metered and that the potentiometer or transformer 27 increases the secondary voltage 0.1 volt per barrel at 30° API and 0.2 volt per barrel at 40° API. Both the voltage and resistance will be 0 at the start of a metering cycle due to the apparatus being electrically reset. The ammeter 47 is calibrated so that it reads from 1 to 2 amps. to be indicated as 30° to 40° API. Now, 100 barrels of oil at 30° API is metered. The resistance will be 10 ohms and the voltage will be 10 volts; therefore, the current will be 1 amp. which will be indicated at 30° API. Subsequently, an additional 100 barrels of oil at 40° API are metered. The resistance would be increased by 10 ohms for a total of 20 ohms while the voltage would be increased 20 volts for a total secondary voltage of 30 volts. The current flow as measured by the ammeter would be 1.5 amps. and would be equivalent to 35° API, the average gravity for 100 barrels of 30° API gravity oil and 100 barrels at 40° API gravity oil.

The voltage and resistance ranges are selected so that the present apparatus may be used for the maximum volume of fluid to be metered per unit time, or between resets of the present apparatus. In normal operation, the transformer 27 and resistor 38 are reset to zero after each meter reading is taken. If there are variations in line voltage to the apparatus, a constant voltage regulator should be used on the primary voltage source to prevent errors.

While the element 12 has been described as a gravity meter and the ammeter 47 has been described as reading the average gravity at any time, it is realized that the present apparatus can also be employed to measure other characteristics of a fluid passing through the pipe line 10. For example, the measuring element 12 may be a temperature-measuring and indicating device which measures the temperature of the fluid stream in the pipe line 10 while the ammeter 47 records the average temperature of the total volume of fluid passing through the pipe line.

Figure 2:
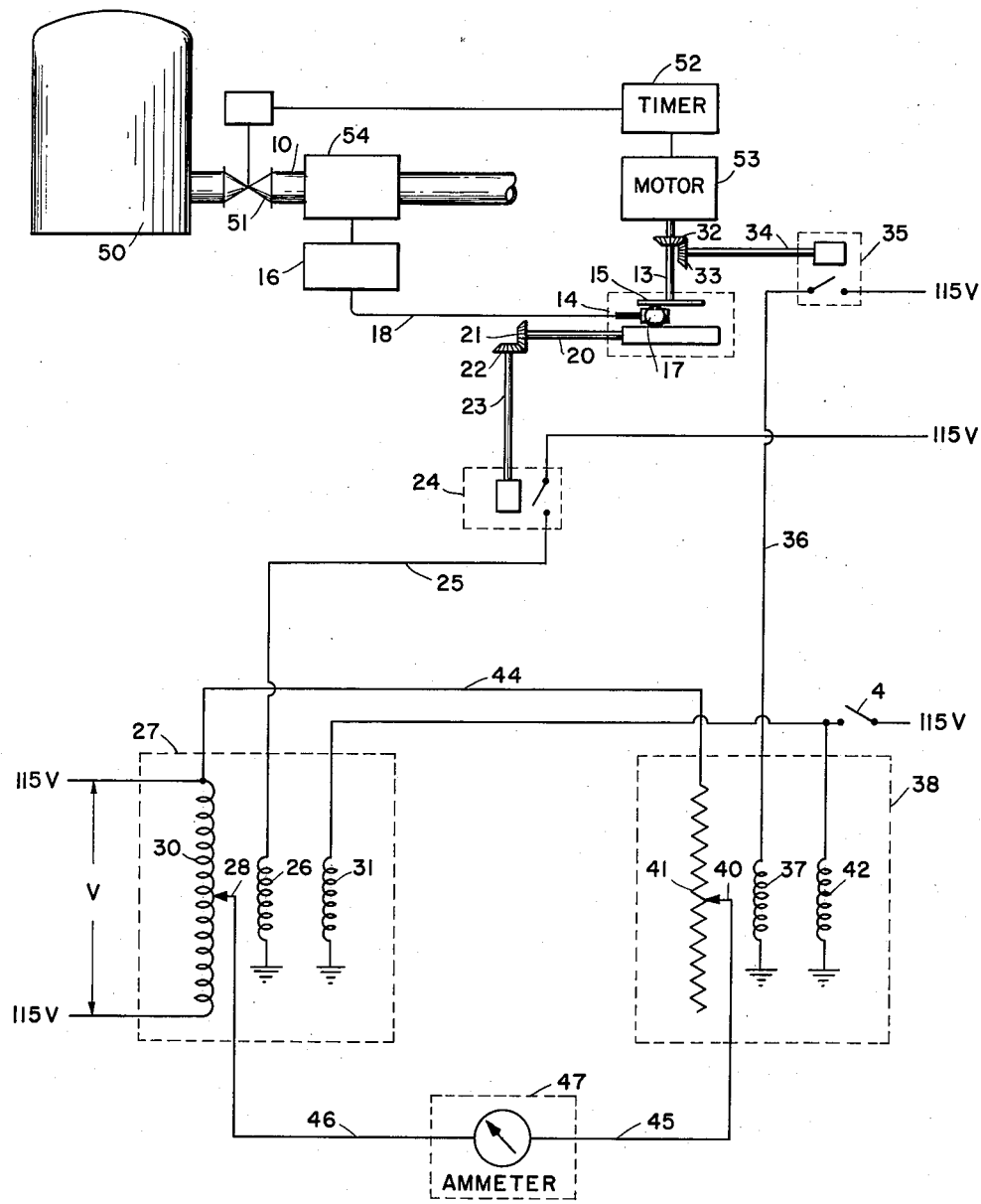
Figure 2 is a diagrammatic view illustrating another arrangement of the component parts of the present system when employed wtih a dump-type meter.

In Figure 2 of the drawing, an arrangement of the present apparatus is shown wherein the pipe line 10 is connected to a tank 50, there being a valve 51 in said pipeline which, upon opening, actuates a timer or other energizing device 52 which operates a motor 53 all the time that the valve 51 is open or for any pre-selected period. Thus, if the tank 50 holds a thousand barrels of oil each time that it is filled, there is no need to employ a flowmeter 11 (Figure 1) in the line 10 but instead a motor 53 could be substituted to drive the disc 15 of the integrator 14. In the arrangement of Figure 2 it will be assumed that a temperature-measuring and indicating device 54 will have been substituted for the gravity indicating and measuring device 12 of Figure 1. Alternatively, the temperature-measuring and indicating device 54 may be in direct contact with the liquid in tank 50 rather than with the liquid in the pipe line 10.

Thus, in operation, the output from the electric motor 53, which is run for exactly the same time that it requires for the tank 50 to perform its dumping operation, actuates the rotary-type electrical switch 35 which causes the variable resistor 38 to increase the load resistance in direct proportion to the accumulated motor revolutions. The output from the electric motor 53 also acts as an input signal to the ball-and-disc linear integrator 14. The ball mechanism of the integrator 14 is positioned, through mechanical hydraulic, electric, or pneumatic transmission means, by the temperature-measuring instrument 54 so that at minimum temperature the output of the integrator is equal to the input, or to any convenient reference value. At maximum temperature the output is preferably twice the input speed. The output of the integrator 14 is connected to the rotary switch 24 whose actuation causes the stepping transformer 27 to increase the secondary voltage in direct proportion to the integrated motor-temperature input signals. The ammeter in the load circuit, by correct calibration, indicates the average temperature of a batch of oil is as follows. For this example it is assumed that the temperature change range is from between 0 and 100° F. Also it is assumed that the resistor 38 increases the load resistance 0.1 ohm per second of motor operation and that the potentiometer increases the secondary voltage of 0.1 volt per second at 0° F. and 0.2 volt per second at 100° F. Both voltage and resistance will be 0 at the start of the metering cycle due to the apparatus having been electrically reset. The ammeter is calibrated so that it indicates from 0° to 100° F. when measuring from 1 to 2 amps. It will also be assumed that the motor is timed to run 100 seconds per dump of the meter tank 50 and that the temperature of the oil in the first dump was 0° F.

After one dump or emptying of the meter tank 50, the resistance will be 10 ohms and the voltage will be 10 volts; therefore, the current is 1 amp. which is indicated as 0° F. Now assume that a second dump or emptying of the meter tank takes place with the temperature of the second batch of oil being 100° F. throughout the entire run. The resistance would be increased by 10 ohms for a total of 20 ohms while the voltage would be increased 20 volts for a total secondary voltage of 30 volts. The current flow, as measured by the ammeter, would be 1.5 amps. and would be indicated at 50° F., the average temperature for 1 tank load of oil at 0° F. and a second load at 100° F.

Although the apparatus of the present invention has been described with regard to averaging the temperature and/or gravity of a volume of liquid it is realized that by use of multiple variable resistors in a circuit a number of characteristics of the liquid could be averaged, such for example as the water content in oil. Likewise, the present apparatus could be employed for averaging such gas flow variables as pressure, temperature, specific gravity, etc.

I claim as my invention:

1. Apparatus for obtaining the average value of a variable characteristic of a fluid stream passing through a pipe line, said apparatus comprising a pipe line, means responsive to the flow of fluid through said pipe line, said means having a rotatable shaft, measuring means in communication with the fluid in said pipe line for measuring the characteristic of the fluid to be averaged, means for integrating the signal from said measuring means with the rotation of said shaft, and electrical circuit means including current controlling elements, said integrating means and said shaft being operably coupled to said current controlling elements to adjust the current flow in said circuit means in response to the average value of the characteristic of the fluid being measured, and means in said circuit means for indicating the current flow therein.

2. Apparatus for obtaining the average value of a variable characteristic of a fluid stream passing through a pipe line, said apparatus comprising a pipe line, means responsive to the flow of fluid through said pipe line, said means having a rotatable shaft, measuring means in communication with the fluid in said pipe line for measuring the characteristic of the fluid to be averaged, means for integrating the signal from said measuring means with the rotation of said shaft to provide an integrated flow characteristic signal, and circuit means including a variable voltage source, a variable resistor and a current measuring device, said variable voltage means being connected to said integrating means to control the voltage in said circuit means in proportion to the magnitude of the integrated flow-characteristic signal, said variable resistor being connected to said rotating shaft to increase the resistance in said circuit means in proportion to the number of rotations of said shaft, whereby the current in said circuit means is proportional to the average value of the fluid characteristic being measured.

3. Apparatus for obtaining the average value of a variable characteristic of a fluid stream passing through a pipe line, said apparatus comprising a pipe line, means responsive to the flow of fluid through said pipe line, said means having a rotatable shaft, measuring means in communication with the fluid in said pipe line for measuring the characteristic of the fluid to be averaged, a ball-and-disc linear integrator having a pair of input shafts and an output shaft, signal transmission means operatively connecting said measuring means with the ball of said integrator, linkage means operatively connecting the disc of said integrator with the means responsive to the fluid flow in said pipe line, and circuit means connected to a power source, said circuit means comprising a pair of rotary switches, a stepping variable voltage source, a stepping variable resistor, and an ammeter, one of said rotary switches being connected to and actuated by the output shaft of said integrator, said rotary switch being coupled to actuate the movable tap of said stepping variable voltage source, the other of said rotary switches being actuated by said means responsive to the fluid flow in said pipe lines, said other rotary switch being coupled to actuate the movable tap of said stepping variable resistor, said resistor and ammeter being connected in series with said variable voltage source.

4. Apparatus for obtaining the average value of the gravity of a fluid stream passing through a pipe line, said apparatus comprising a pipe line, a flowmeter responsive to the flow of fluid through said pipe line, said flowmeter having a rotatable shaft, gravity-measuring means in communication with the fluid in said pipe line for measuring the gravity of the fluid to be averaged, a ball-and-disc linear integrator having a pair of input shafts and an output shaft, signal transmission means operatively connecting said gravity-measuring means with the ball of said integrator, linkage means operatively connecting the disc of said integrator with the flowmeter and circuit means connected to a power source, said circuit means comprising a pair of rotary switches, a stepping variable voltage source, a stepping variable resistor, and an ammeter, one of said rotary switches being connected to and actuated by the output shaft of said integrator, said rotary switch being coupled to said stepping variable voltage source, the other of said rotary switches being actuated by said flowmeter, said other rotary switch being coupled to actuate the movable tap of said stepping variable resistor, said resistor and ammeter being connected in series with said variable voltage source.

5. Apparatus for obtaining the average value of the temperature of a fluid stream passing through a pipe line, said apparatus comprising a pipe line, motor means operable in response to the flow of fluid through said pipe line, said motor means having a rotatable shaft, temperature-measuring means in communication with the fluid in said pipe line for measuring the temperature of the fluid to be averaged, a ball-and-disc linear integrator having a pair of input shafts and an output shaft signal transmission means operatively connecting said temperature-measuring means with the ball of said integrator, linkage means operatively connecting the disc of said integrator with the motor means and circuit means connected to a power source, said circuit means comprising a pair of rotary switches, a stepping variable transformer, a stepping variable resistor, and an ammeter, one of said rotary switches being connected to and actuated by the output shaft of said integrator, said rotary switch being coupled to actuate the movable tap of said stepping variable transformer, the other of said rotary switches being actuated by said motor means, said other rotary switch being coupled to actuate the movable tap of said stepping variable resistor, said resistor and ammeter being connected in series with said transformer.

References Cited in the file of this patent
UNITED STATES PATENTS

| | | |
|---|---|---|
| 2,617,299 | Ennis et al. | Nov. 11, 1952 |
| 2,826,068 | Sperry | Mar. 11, 1958 |